US012482912B2

(12) United States Patent
Jia et al.

(10) Patent No.: US 12,482,912 B2

(45) Date of Patent: Nov. 25, 2025

(54) PHASE SHIFTER OPERABLE IN A DIFFERENTIAL MODE COMPRISING A FIRST CONDUCTIVE STRUCTURE AND A SECOND CONDUCTIVE STRUCTURE THAT FORM A CAPACITOR THEREBETWEEN

(71) Applicants: Beijing BOE Sensor Technology Co., Ltd., Beijing (CN); BOE TECHNOLOGY GROUP CO., LTD., Beijing (CN)

(72) Inventors: Haocheng Jia, Beijing (CN); Yi Ding, Beijing (CN); Xiaobo Wang, Beijing (CN); Hao Guo, Beijing (CN); Yan Lu, Beijing (CN); Weisi Zhou, Beijing (CN); Wenxue Ma, Beijing (CN); Jing Wang, Beijing (CN); Chuncheng Che, Beijing (CN)

(73) Assignees: Beijing BOE Sensor Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/041,626

(22) PCT Filed: Feb. 17, 2022

(86) PCT No.: PCT/CN2022/076697

§ 371 (c)(1),
(2) Date: Feb. 14, 2023

(87) PCT Pub. No.: WO2023/155109

PCT Pub. Date: Feb. 4, 2023

(65) Prior Publication Data

US 2024/0266704 A1 Aug. 8, 2024

(51) Int. Cl.
*H01P 1/18* (2006.01)
*H01Q 3/36* (2006.01)

(52) U.S. Cl.
CPC ................ *H01P 1/184* (2013.01); *H01P 1/18* (2013.01); *H01Q 3/36* (2013.01)

(58) Field of Classification Search
CPC ............. H01P 1/184; H01P 1/18; H01P 1/185
USPC ................................................. 333/156, 161
See application file for complete search history.

(56) References Cited

U.S. PATENT DOCUMENTS

| | | | | |
|---|---|---|---|---|
| 3,568,105 | A * | 3/1971 | Felsenheld | H01P 1/185 333/164 |
| 2015/0380789 | A1 | 12/2015 | Jakoby et al. | |
| 2016/0006092 | A1 | 1/2016 | Ueda et al. | |
| 2021/0080765 | A1 | 3/2021 | Hu et al. | |
| 2021/0234268 | A1 | 7/2021 | Liu et al. | |

FOREIGN PATENT DOCUMENTS

| | | | |
|---|---|---|---|
| CN | 109193081 | A | 1/2019 |
| CN | 111490314 | A | 8/2020 |

(Continued)

OTHER PUBLICATIONS

Hu et al, "Liquid Crystal Varactor Loaded Variable Phase Shifter for Integrated, Compact, and Fast Beamsteering Antenna Systems", 9th European Microwave Integrated Circuits Conference, Oct. 6-7, 2014, Rome, Italy, 4 pages.

(Continued)

*Primary Examiner* — Benny T Lee
(74) *Attorney, Agent, or Firm* — Dority & Manning, P.A.

(57) ABSTRACT

A phase shifter is provided. The phase shifter includes a plurality of phase shift units coupled in sequence. At least one phase shift unit of the plurality of phase shift units includes: a first conductive structure and a second conductive structure. The first conductive structure includes at least one first transmission line, and a second transmission line connected to the at least one first transmission line, the (Continued)

second transmission line being configured as an inductive load. The second conductive structure includes at least one third transmission line, each third transmission line being configured to form a capacitor with a first transmission line. The first transmission line, the third transmission line and the capacitor constitute at least a portion of a phase shift communication path of the phase shifter.

19 Claims, 9 Drawing Sheets

(56) References Cited

FOREIGN PATENT DOCUMENTS

| | | | |
|---|---|---|---|
| CN | 113540711 | A | 10/2021 |
| CN | 113611991 | A | 11/2021 |
| EP | 3664215 | A1 | 6/2020 |
| EP | 3745526 | A1 | 12/2020 |

OTHER PUBLICATIONS

Jakoby et al, "Microwave Liquid Crystal Enabling Technology for Electronically Steerable Antennas in SATCOM and 5G Millimeter-Wave Systems", Crystals, Jun. 16, 2020, 56 pages.
Wei et al, "Development of Electrically Controlled Liquid Crystal Phased Array Antenna" with English Translation, Space-Integrated-Ground Information Networks, vol. 1, No. 2, Dec. 2020, 24 pages.

* cited by examiner

PHASE SHIFTER OPERABLE IN A DIFFERENTIAL MODE COMPRISING A FIRST CONDUCTIVE STRUCTURE AND A SECOND CONDUCTIVE STRUCTURE THAT FORM A CAPACITOR THEREBETWEEN

CROSS-REFERENCE TO RELATED APPLICATION

This application is a national phase entry under 35 USC 371 of International Patent Application No. PCT/CN2022/076697 filed on Feb. 17, 2022, which is incorporated herein by reference in its entirety.

TECHNICAL FIELD

The present disclosure relates to the field of signal processing technologies, and in particular, to a phase shifter, an antenna and an electronic device.

BACKGROUND

Phase shift control technologies commonly used in the current communication field include a digital baseband signal processing technology and a phase shifter technology. The phase shifter technology occupies most markets of phase control electronically scanned array antennas due to advantages of low complexity and low cost.

SUMMARY OF THE INVENTION

In one aspect, a phase shifter is provided. The phase shifter includes a plurality of phase shift units coupled in sequence. At least one phase shift unit of the plurality of phase shift units includes a first conductive structure and a second conductive structure. The first conductive structure includes at least one first transmission line, and a second transmission line connected to the at least one first transmission line. The second transmission line is configured as an inductive load. The second conductive structure includes at least one third transmission line. Each third transmission line is configured to form a capacitor with a first transmission line. The first transmission line, the third transmission line and the capacitor constitute at least a portion of a phase shift communication path of the phase shifter.

In some embodiments, the first conductive structure includes two first transmission lines, and the second transmission line is connected to the two first transmission lines. The two first transmission lines are configured to transmit two signals that are differential mode signals of each other.

In some embodiments, a dimension of at least one of the two first transmission lines in an extending direction of the phase shift communication path is greater than a dimension of the second transmission line in the extending direction of the phase shift communication path. The second transmission line is located between the two first transmission lines, the second transmission line is connected to any portion of each first transmission line other than both ends thereof.

In some embodiments, the second conductive structure includes two third transmission lines. One third transmission line is configured to form a capacitor with one of the two first transmission lines, and another third transmission line is configured to form a capacitance with another of the two first transmission lines.

In some embodiments, the second conductive structure further includes a fourth transmission line connected to the two third transmission lines.

In some embodiments, a dimension of at least one of the two third transmission lines in an extending direction of the phase shift communication path is greater than or equal to a dimension of the fourth transmission line in the extending direction of the phase shift communication path.

In some embodiments, the two third transmission lines are arranged at an interval.

In some embodiments, the plurality of phase shift units includes a plurality of first conductive structures and a plurality of second conductive structures. Orthographic projections of the first conductive structures on a plane where the phase shifter is located and orthographic projections of the second conductive structures on the plane where the phase shifter is located are alternately arranged. A third transmission line is configured to form capacitors with two first transmission lines adjacent thereto respectively; and/or a first transmission line is configured to form capacitors with two third transmission lines adjacent thereto respectively.

In some embodiments, the phase shifter further includes two support layers disposed opposite to each other. The first conductive structure and the second conductive structure are disposed on two sides, proximate to each other, of the two support layers, respectively. An orthographic projection of the first transmission line on a support layer partially overlap with an orthographic projection of the third transmission line on the support layer to form the capacitor.

In some embodiments, the phase shifter further includes two support layers disposed opposite to each other. The first conductive structure and the second conductive structure are disposed on a side of one of the two support layers facing another of the two support layers. The first transmission line includes a first body portion and first end portions connected thereto, the third transmission line includes a second body portion and second end portions connected thereto, and a first end portion and a second end portion are oppositely arranged at an interval to form a capacitor.

In some embodiments, a dimension of the first end portion in a direction perpendicular to an extending direction of the phase shift communication path is greater than a dimension of the first body portion in the direction perpendicular to the extending direction of the phase shift communication path. A dimension of the second end portion in the direction perpendicular to the extending direction of the phase shift communication path is greater than a dimension of the second body portion in the direction perpendicular to the extending direction of the phase shift communication path.

In some embodiments, the phase shifter further includes a dielectric constant adjustable medium. The dielectric constant adjustable medium is filled between the two support layers.

In some embodiments, the phase shifter further includes a first control line and a second control line. The first control line are coupled to the first conductive structure, the second control line is coupled to the second conductive structure. The dielectric constant adjustable medium is configured such that a dielectric constant of the dielectric constant adjustable medium is changed under control of voltages of the first control line and the second control line.

In some embodiments, the first conductive structure and the second conductive structure are disposed on the two support layers, respectively. The first control line is disposed on a side of the first conductive structure away from the second conductive structure, and is disposed parallel to an extending direction of the phase shift communication path. The second control line is disposed on a side of the second conductive structure away from the first conductive structure, and is disposed parallel to the extending direction of the phase shift communication path.

In some embodiments, the first conductive structure and the second conductive structure are disposed on a same support layer. The first control line is disposed perpendicular to an extending direction of the phase shift communication path. The second control line is disposed perpendicular to the extending direction of the phase shift communication path.

In some embodiments, at least one of the first transmission line, the second transmission line and the third transmission line has a shape of a curve or a broken line.

In some embodiments, at least one of the first transmission line, the second transmission line and the third transmission line includes a microstrip line and/or a strip line.

In another aspect, an antenna is provided. The antenna includes a transceiver and the phase shifter as described above. The transceiver is electrically connected to the phase shifter.

In yet another aspect, an electronic device is provided. The electronic device includes the phase shifter as described above.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on an actual size of a product, an actual process of a method and actual timings of signals to which the embodiments of the present disclosure relate.

DETAILED DESCRIPTION OF THE INVENTION

Figure 1:
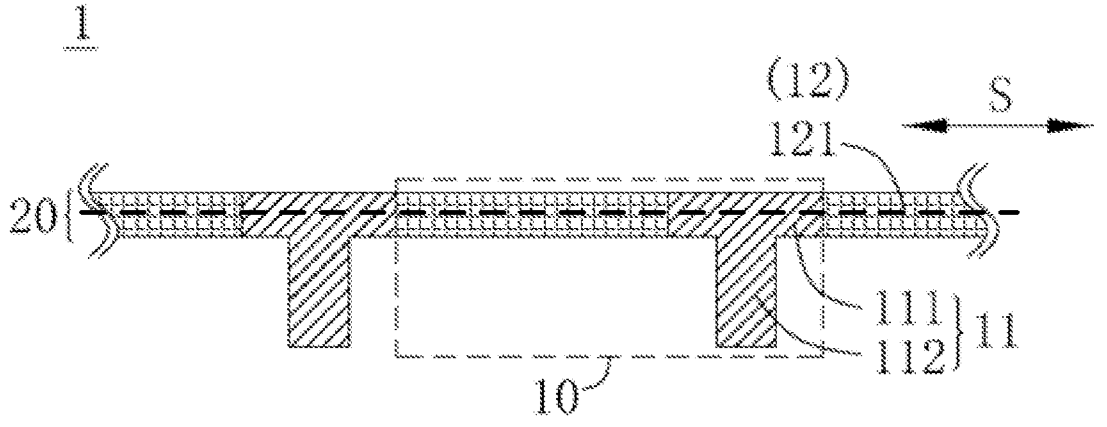
FIG. 1 is a structural diagram of a phase shifter, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person having ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment," "some embodiments," "exemplary embodiments," "example," "specific example" or "some examples" are intended to indicate that specific features, structures, materials or characteristics related to the embodiment(s) or example(s) are included in at least one embodiment or example of the present disclosure. Schematic representations of the above term do not necessarily refer to the same embodiment(s) or example(s). In addition, specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with the term such as "first" or "second" may explicitly or implicitly include one or more features. In the description of the embodiments of the present disclosure, the term "a plurality of/the plurality of" means two or more unless otherwise specified.

In the description of some embodiments, the terms "connected" and "electrically connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, depending on the context, the term "if" is optionally construed as "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of the phase "applicable to" or "configured to" herein means an open and inclusive language, which does not exclude devices that are applicable to or configured to perform additional tasks or steps.

In addition, the use of the phrase "based on" means openness and inclusiveness, since a process, step, calculation or other action that is "based on" one or more of the stated conditions or values may, in practice, be based on additional conditions or values exceeding those stated.

The term such as "about" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Exemplary embodiments are described herein with reference to segmental views and/or plan views as idealized exemplary drawings. In the accompanying drawings, thicknesses of layers and sizes of regions are enlarged for clarity. Therefore, variations in shapes with respect to the accompanying drawings due to, for example, manufacturing technologies and/or tolerances may be envisaged. Therefore, the exemplary embodiments should not be construed as being limited to the shapes of the regions shown herein, but as including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of regions in an apparatus, and are not intended to limit the scope of the exemplary embodiments.

A phase shift structure of a phase shifter has a right-hand transmission characteristic. That is, main transmission has an inductive characteristic, and branch transmission has a capacitive characteristic. A phase constant of a signal transmitted by the phase shifter is a positive number, that is, there is a phase delay of the signal in a transmission direction. A signal of a communication path with the phase shifter has a greater delay compared to a signal of a communication path without the phase shifter. In order to achieve phase balance between the signal of the communication path with the phase shifter and the signal of the communication path without the phase shifter, a delay line needs to be configured in a circuit where a signal with an advance phase is located (i.e., the communication path without the phase shifter) to offset a delay amount caused by the phase shifter. As a result, a long delay line needs to be arranged.

Figure 2:
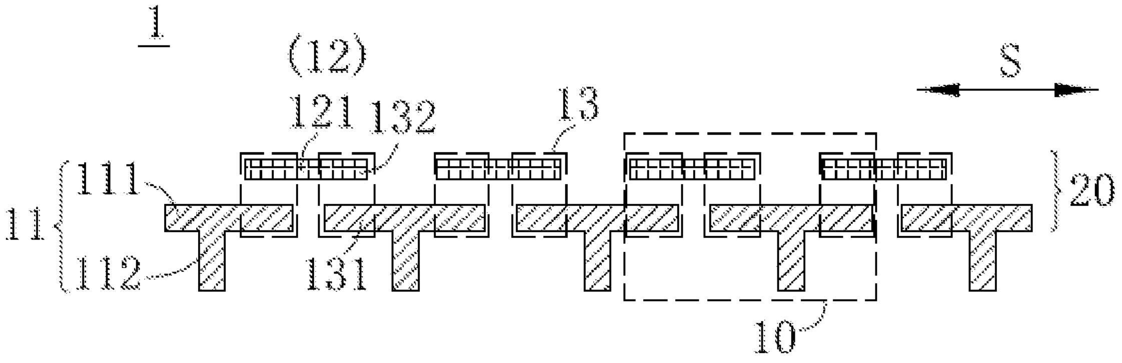
FIG. 2 is a structural diagram of another phase shifter, in accordance with some embodiments.
Figure 3:
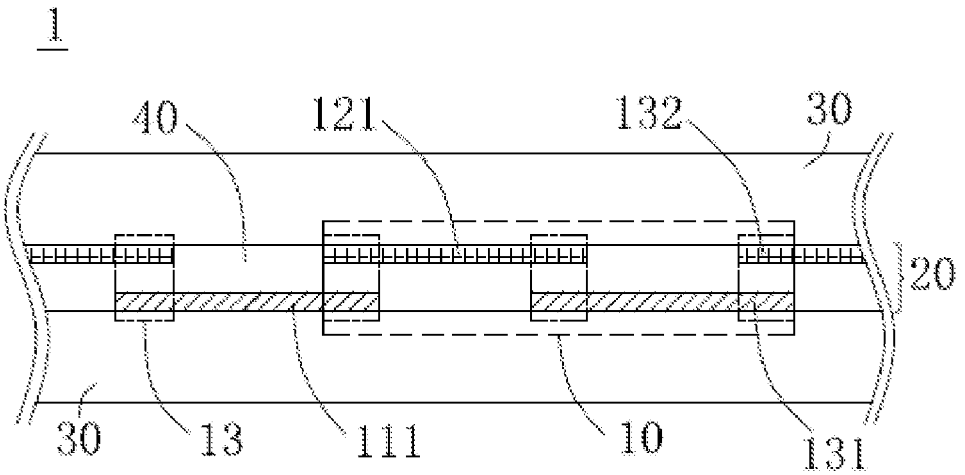
FIG. 3 is a sectional view of a phase shifter taken along the dash line in FIG. 1, in accordance with some embodiments.

In light of this, referring to FIGS. 1 to 3, FIG. 1 is a structural diagram of a phase shifter in accordance with some embodiments, FIG. 2 is a structural diagram of another phase shifter in accordance with some embodiments, and FIG. 3 is a sectional view of a phase shift communication path 20 in FIG. 1. Some embodiments of the present disclosure provide a phase shifter 1 (also shown in FIGS. 5, 7, 9, 12 and 16). The phase shifter 1 includes a plurality of phase shift units 10 coupled sequentially (also shown in FIGS. 8-9 and 12-13). At least one phase shift unit 10 of the plurality of phase shift units 10 includes a first conductive structure 11 and a second conductive structure 12. The first conductive structure 11 includes a first transmission line 111, and a second transmission line 112 (shown in FIGS. 1 and 2) connected to the first transmission line 111. The second transmission line 112 is configured as an inductive load. The second conductive structure 12 includes a third transmission line 121. The third transmission line 121 is configured to form a capacitor 13 with the first transmission line 111. The first transmission line 111, the third transmission line 121 and the capacitance 13 constitute at least a portion of the phase shift communication path 20 of the phase shifter 1.

Each phase shift unit 10 has phase shift effect, i.e., effect of adjusting a phase of a signal. Phase shift effect of the plurality of phase shift units 10 is accumulated to achieve a phase shift function of the phase shifter 10. Phase shift amounts of different phase shift units for a signal may be the same or different.

The plurality of phase shift units 10 are coupled sequentially. The plurality of phase shift units 10 may be arranged sequentially in a straight line, and a phase shift unit 10 is coupled to two phase shift units 10 adjacent thereto. Of course, the plurality of phase shift units 10 may also be arranged in a curve or a broken line, which is not limited herein. For example, in three phase shift units 10 that are arranged sequentially, a middle phase shift unit 10 is coupled to a previous phase shift unit 10 and a next phase shift unit 10 to achieve a continuous coupling.

The plurality of phase shift units 10 are sequentially coupled to transmit a signal from one phase shift unit 10 to another phase shift unit 10. Transmission paths in the phase shift units 10 for the signal inside the phase shifter 1 together form the phase shift communication path 20 inside the phase shifter 1, and a extending direction S of the phase shift communication path 20 is shown in FIGS. 1, 2, 5, 7, 9, 10, 12 and 16.

The phase shift unit 10 includes the first conductive structure 11 and the second conductive structure 12. A first conductive structure 11 and a second conductive structure 12 in a same phase shift unit 10 may be coupled to each other. In the plurality of phase shift units 10 coupled sequentially, a first conductive structure 11 of a middle phase shift unit 10 is coupled to a second conductive structure 12 of a previous shift phase unit 10, and a second conductive structure 12 of the middle phase shift unit 10 is coupled to a first conductive structure 11 of a next shift phase unit 10. Alternatively, in the plurality of phase shift units 10 coupled sequentially, the first conductive structure 11 of the middle phase shift unit 10 is coupled to a first conductive structure 11 of the previous shift phase unit 10, and the second conductive structure 12 of the middle phase shift unit 10 is coupled to a second conductive structure 12 of the next shift phase unit 10.

The numbers of the first conductive structures 11 and the second conductive structures 12 in the phase shift unit 10 may be the same or different. For example, a phase shift unit 10 includes one first conductive structure 11 and one second conductive structure 12. For another example, a phase shift unit 10 includes two first conductive structures 11 and one second conductive structure 12. Of course, the numbers of the first conductive structures 11 and the second conductive structures 12 in the phase shift unit 10 may be other combinations. The combinations of the numbers of the first conductive structures 11 and the second conductive structures 12 in the phase shift unit 10 are merely described herein by taking examples, and should not be construed as limiting the numbers of the first conductive structures 11 and the second conductive structures 12.

The first conductive structure 11 includes the first transmission line 111, and the second transmission line 112 connected to the first transmission line 111. The number of the first transmission lines 111 may be greater than or equal to the number of the second transmission lines. For example, the first conductive structure 11 includes one first transmission line 111 and one second transmission line 112. For another example, the first conductive structure 11 includes two first transmission lines 111 and one second transmission line 112. Of course, the numbers of the first transmission lines 111 and the second transmission lines 112 in the first conductive structure 11 may be other combinations. The combinations of the numbers of the first transmission lines 111 and the second transmission lines 112 in the first conductive structure 11 are only described herein by taking examples, and should not be construed as limiting the numbers of the first transmission lines 111 and the second transmission lines 112.

A position where the first transmission line 111 is connected to one end of the second transmission line 112 is a center of the first transmission line 111, or other position between both ends of the first transmission line 111. The other end of the second transmission line 112 may be connected to the ground. An extending direction of the first transmission line 111 may be substantially perpendicular to an extending direction of the second transmission line 112. The first transmission line 111 and the second transmission line 112 may be made of a metal or non-metal conductive material. The metal material may be copper, aluminum, silver, or the like.

The second transmission line 112 is configured as an inductive load. The inductive load refers to a load with inductive parameters, and a load current of the inductive load lags behind a load voltage thereof by one phase difference. Internal impedance of the second transmission line 112 is configured as the inductive load, which may be achieved by setting a value of a physical length of the second transmission line 112. For example, the value of the physical length of the second transmission line 112 satisfies a condition where an electrical length is less than one quarter of a wavelength of a signal, where the electrical length refers to a ratio of the physical length of the second transmission line 112 to the wavelength of the transmitted signal.

Figure 5:
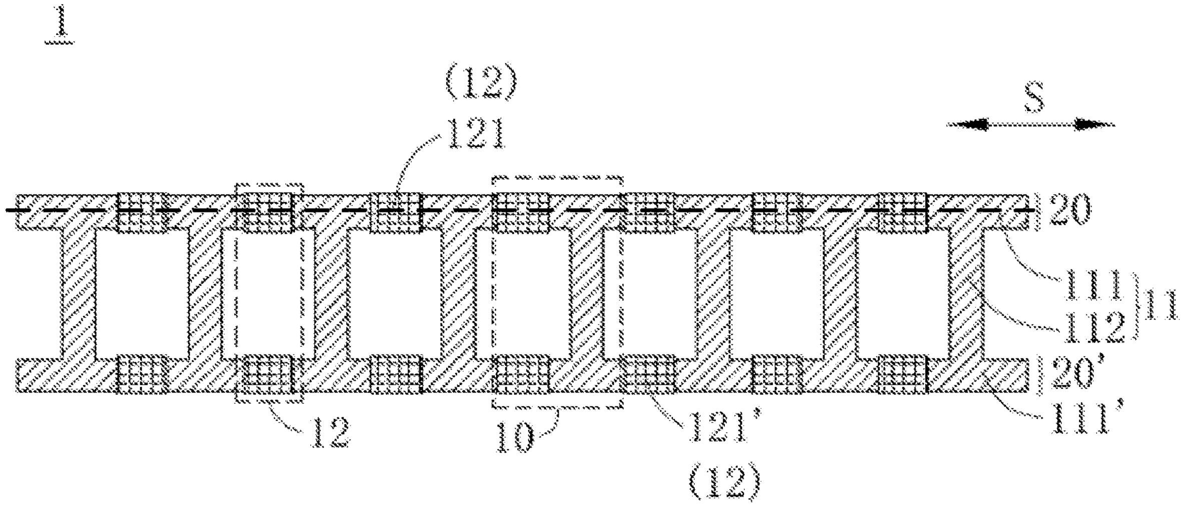
FIG. 5 is a structural diagram of yet another phase shifter, in accordance with some embodiments.
Figure 16:
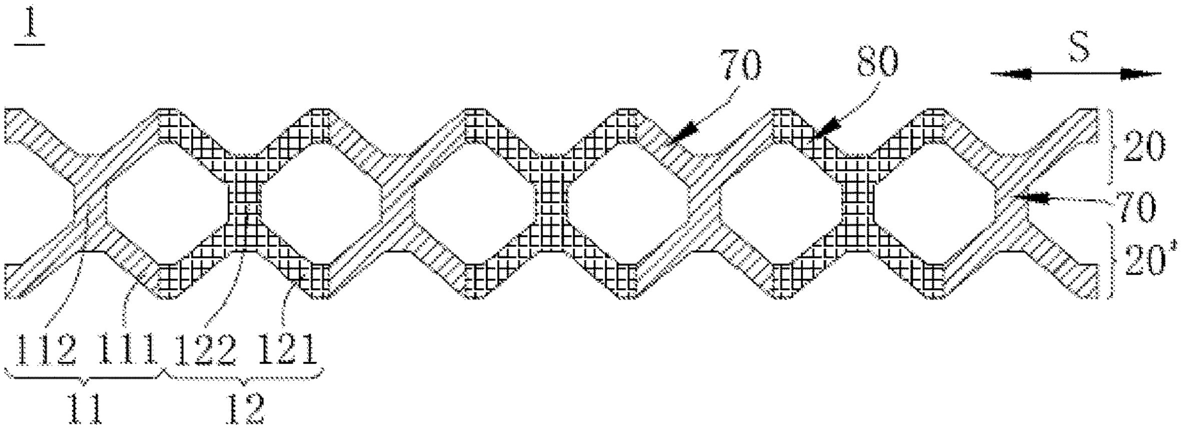
FIG. 16 is a structural diagram of yet another phase shifter, in accordance with some embodiments.

The second conductive structure 12 includes the third transmission line 121, as shown in FIGS. 5 and 16. The third transmission line 121 is configured to form the capacitor 13 with the first transmission line 111. The number of the third transmission lines 121 in a second conductive structure 12 may be one or more. For example, the number of the third transmission lines 121 may be the same as the number of the first transmission lines 111.

An extending direction of the third transmission line 121 may be the same as the extending direction of the first transmission line 111. An extending length of the third transmission line 121 may be greater than, less than or equal to an extending length of the first transmission line 111, which is not limited herein. The third transmission line 121 may be made of a metal or non-metal conductive material. The metal material may be copper, aluminum, silver, or the like.

In some embodiments, in the plurality of phase shift units 10 coupled sequentially, a first transmission line 111 of the middle phase shift unit 10 may be coupled to a third transmission line 121 of the previous phase shift unit 10, and a third transmission line 121 of the middle phase shift unit 10 may be coupled to a first transmission line 111 of the next phase shift unit 10. The plurality of phase shift units 10 are sequentially coupled to form the phase shift communication path 20 that can transmit the signal inside the phase shifter 1. The first transmission line 111 and the third transmission line 121 in the phase shift unit 10, and the capacitor 13 formed by the coupling of the first transmission line 111 and the third transmission line 121 constitutes at least a portion of the phase shift communication path of the phase shifter 1.

A dimension of the first transmission line 111 in a direction perpendicular to the extending direction S (as shown in FIGS. 1, 2, 5, 8, 9, 12 and 16) of the phase shift communication path 20 may be equal to a dimension of the third transmission line 121 in the direction perpendicular to the extending direction S of the phase shift communication path 20, or may be greater than the dimension of the third transmission line 121 in the direction perpendicular to the extending direction S of the phase shift communication path 20, or may be less than the dimension of the third transmission line 121 in the direction perpendicular to the extending direction S of the phase shift communication path 20, which is not limited herein.

It will be noted that the term "perpendicular" as described in embodiments of the present disclosure is substantially perpendicular. For example, an included angle between two directions is equal to 90° or close to 90°, such as 93.3°, 92.5°, 92°, 91°, 89°, 88°, 87.5° or 86.4°.

As shown in FIGS. 2 and 3, the first transmission line 111 and the third transmission line 121 are oppositely arranged at an interval. Different voltages are respectively applied to the first transmission line 111 and the third transmission line 121, and a potential difference is generated between the first transmission line 111 and the third transmission line 121, thereby forming the capacitor. A portion of the first transmission line 111 opposite to the third transmission line 121 serves as a first plate 131 of the capacitor 13, and a portion of the third transmission line 121 opposite to the first transmission line 111 serves as a second plate 132 of the capacitor 13.

Figure 4:
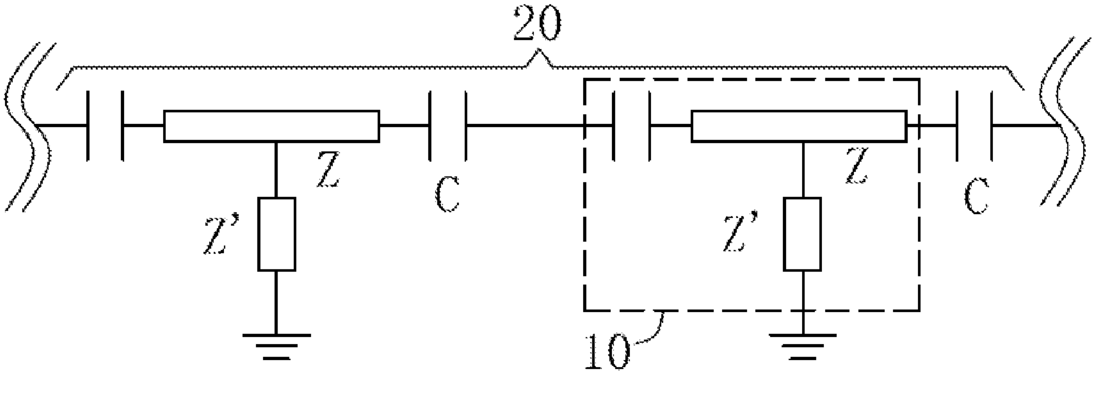
FIG. 4 is an equivalent circuit diagram of a phase shifter, in accordance with some embodiments.

Due to the internal impedance of the first transmission line 111 and the capacitor (C) 13 formed by the coupling of the first transmission line 111 and the third transmission line 121, the phase shift communication path 20 is configured as an resistor-capacitor (RC) series circuit, and an equivalent circuit diagram thereof is shown by FIG. 4, in which the internal impedance of the first transmission line 111 is equivalent to a resistor Z, and the internal impedance of the second transmission line 112 is equivalent to a resistor Z'. Since the second transmission line 112 has the inductive load and an inductive characteristic, the phase shift unit 10 has a left-hand transmission characteristic. That is, a main path has a capacitive characteristic, and a branch path has an inductive characteristic. In this way, a phase constant of the signal transmitted by the phase shift unit 10 is a positive number, which means that the phase of the signal is advanced in a transmission direction.

In some embodiments, the phase shifter 1 includes the at least one phase shift unit 10 described above. Since the phase shift unit 10 has the left-hand transmission characteristic, the phase of the signal is advanced. In this way, a total signal delay amount caused by the phase shift structure having the right-hand transmission characteristic in the phase shifter 1 may be reduced or even eliminated. As a result, there is a small difference between a signal delay amount of the communication path with the phase shifter and a signal delay amount of a communication path without the phase shifter, and then wiring of an extending line required to be arranged in the communication path without the phase shifter in phase balance may be shortened or even omitted.

For example, the phase shifter 1 includes X phase shift structures having the right-hand transmission characteristic and one phase shift unit 10, where X is a positive integer. In a case where a signal delay amount caused by the phase shift structure having the right-hand transmission characteristic is A and a signal advance amount caused by the phase shift unit 10 is B, the delay amount of phase shifter 1 is equal to X times A minus B (X×A−B), and less than a delay amount X×A of a phase shifter without the phase shift unit 10. Therefore, the wiring length of the extending line required to be arranged in the communication path without the phase shifter in the phase balance may be shortened.

For example, the phase shifter 1 includes X phase shift structures having the right-hand transmission characteristic and Y phase shift units 10, where X and Y are positive integers. The signal delay amount caused by the phase shift structure having the right-hand transmission characteristic is A, and the signal advance amount caused by the phase shift unit 10 is B. In a case where X times A is equal to Y times B (X×A=Y×B) (that is, a total signal delay amount caused by the X phase shift structures having the right-hand transmission characteristic is equal to a total signal advance amount caused by the Y phase shift units 10), the signal on the communication path with the phase shifter 1 balances the signal on the communication path without the phase shifter 1. In this way, the delay line may be omitted, it is conducive to an amplitude phase design of a phase control electronically scanned array, and overall loss of the phase shifter 1 may be reduced.

Of course, the number of the phase shift structures having the right-hand transmission characteristic and the number of the phase shift units 10 in phase shifter 1 may also be other combinations, which is not limited herein.

In the phase shifter provided by the embodiments of the present disclosure, the at least one phase shift unit has the characteristic of advancing the phase of the signal. In designing the phase shifter to balance the signal on the communication path with the phase shifter and the signal on the communication path without the phase shifter, the delay line may be shortened and even omitted, it is conducive to the amplitude phase design of the phase control electronically scanned array, and the overall loss of the phase shifter 1 may be reduced.

In some embodiments, referring to FIGS. 5, 8-9 and 16, the first conductive structure 11 includes two first transmission lines 111 and 111'. The second transmission line 121 is connected to the two first transmission lines 111 and 111'. The two first transmission lines 111 and 111' are configured to transmit two signals that are differential mode signals of each other as shown in FIG. 6.

As shown in FIG. 5, the two first transmission lines 111 and 111' may be substantially parallel. Both ends of the second transmission line 112 are connected to the two first transmission lines 111 and 111', respectively, as shown in FIGS. 5, 8-9 and 12. Extending lengths of the two first transmission lines 111 and 111' may be the same or different, which is not limited herein. In addition, dimensions of the two first transmission lines 111 and 111' in a direction perpendicular to the extending direction of the phase shift communication path 20 may be the same or different.

In some examples, the first conductive structure 111 and 111' may be a central symmetry pattern with respect to a center of the second transmission line 112. In some other embodiments, the first conductive structure 111 and 111' may be an axisymmetric pattern with respect to a central axis of the second transmission line 112.

Figure 6:
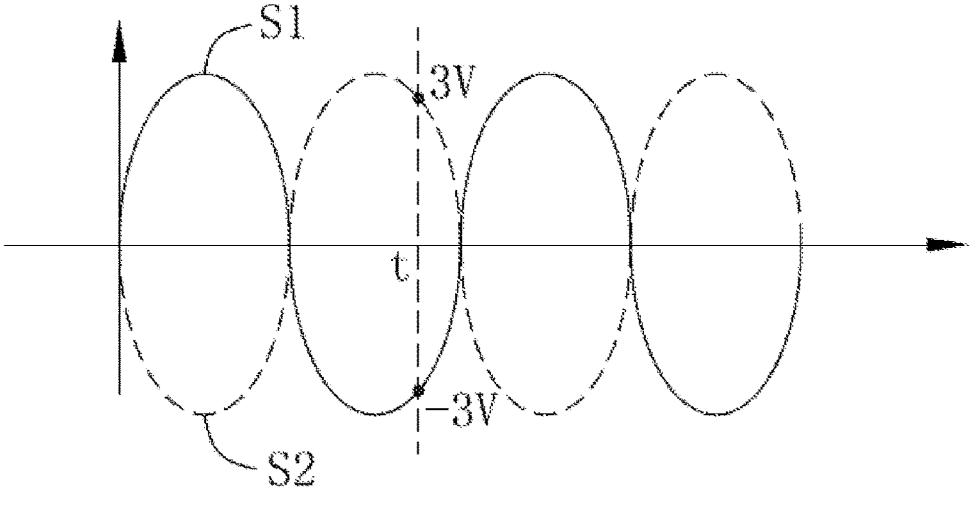
FIG. 6 is a waveform diagram of differential mode signals, in accordance with some embodiments.

The two signals that are differential mode signals of each other are two signals with a same amplitude and a phase difference of 180°, as shown in FIG. 6. A signal S1 and a signal S2 in FIG. 6 are differential mode signals of each other, and are respectively transmitted in the two first transmission lines 111 and 111' connected to the second transmission line 112 (as shown in FIG. 5). In some examples, as shown in FIG. 6, at a moment t, a voltage value of the signal S2 is 3 V, and a voltage value of the signal S1 is −3 V.

Since the signals in the two first transmission lines 111 and 111' are the differential mode signals of each other, the second transmission line 112, whose two ends are respectively connected to the lines transmitting the two signals that are the differential mode signals of each other, is constantly at a low potential. As a result, the second transmission line 112 may be equivalent to a virtual ground, without adding an additional ground wire.

In some embodiments, referring to FIG. 5, a dimension of the first transmission line in the extending direction of the phase shift communication path 20 is greater than a dimension of the second transmission line 112 in the extending direction of the phase shift communication path 20. The second transmission line 112 is located between the two first transmission lines 111 and 111'. The second transmission line 112 is connected to any portion of the first transmission line other than both ends thereof.

Positions where the two ends of the second transmission line 112 are connected to the two first transmission lines 111 and 111' respectively may not be different, or the same. For example, the two ends of the second transmission line 112 are connected to centers of the two first transmission lines 111 and 111', respectively.

A dimension of the second transmission line 112 in a direction perpendicular to the extending direction S of the phase shift communication path 20 may be greater than a dimension of the first transmission line 111 in the direction perpendicular to the extending direction S of the phase shift communication path 20, may be equal to the dimension of the first transmission line 111 in the direction perpendicular to the extending direction S of the phase shift communication path 20, or may be less than the dimension of the first transmission line 111 in the direction perpendicular to the extending direction S of the phase shift communication path 20.

In some embodiments, as shown in FIG. 5, the first conductive structure 11 may have a shape of a capital "H" turned on its side.

Figure 7:
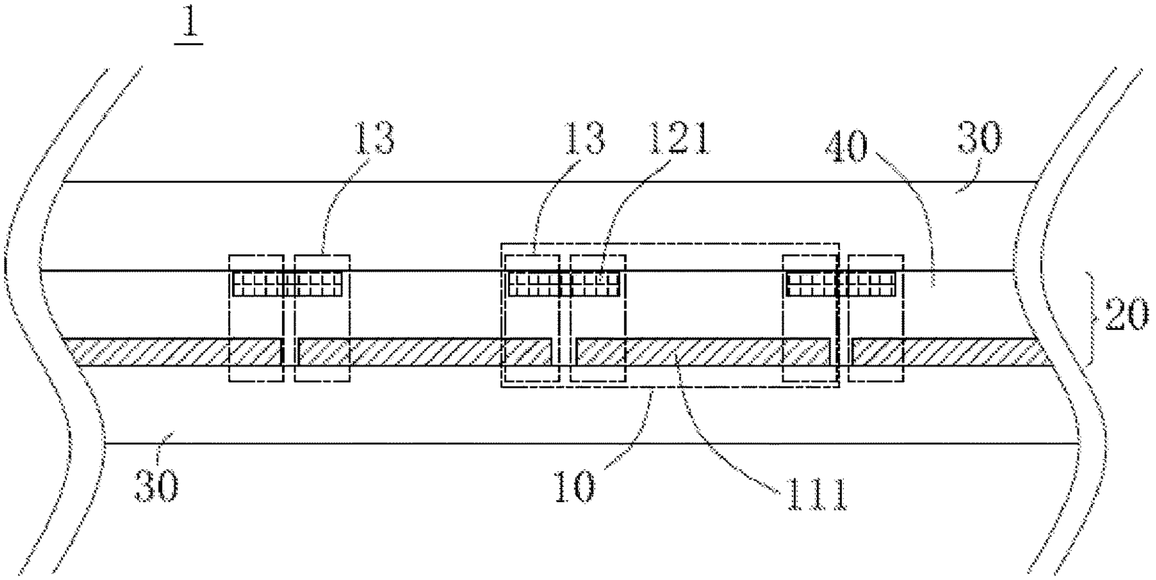
FIG. 7 is a sectional view of another phase shifter taken along the dash line in FIG. 5, in accordance with some embodiments.

In some embodiments, referring to FIGS. 5 and 7, a second conductive structure 12 includes two third transmission lines 121 and 121'. One third transmission line 121 is configured to form a capacitor 13 (FIG. 7) with one of the two first transmission lines 111 and 111', and the other third transmission line 121' is configured to form a capacitor 13 with the other of the two first transmission lines 111 and 111'.

As shown in FIG. 5, the two third transmission lines 121 and 121' are disposed in one-to-one correspondence with the two first transmission lines 111 and 111' at the two ends of the second transmission line 112. One first transmission line 111 and one third transmission line 121 are oppositely disposed at an interval, and the other first transmission line 111' and the other third transmission line 121' are oppositely disposed at an interval.

The first transmission line 111 on a side of the second transmission line 112, and the third transmission line 121 that forms a capacitor in cooperation with the first transmission line 111 belong to a phase shift communication path 20. The first transmission line 111' on the other side of the second transmission line 112, and the third transmission line 121' that forms a capacitor in cooperation with the first transmission line 111' belong to another phase shift communication path 20' (FIGS. 5, 8, 9, 12 and 16).

Capacitances of the capacitors formed on both sides of the second transmission line 112 may be the same or different, which is not limited herein. In some examples, the capacitors formed on both sides of the second transmission line 112 may be disposed symmetrically with respect to a straight line where centers of a plurality of second transmission lines 112 are located.

In some embodiments, referring to FIGS. 5 and 7, the two third transmission lines 121 and 121' (FIG. 5) are arranged at an interval. The third transmission lines 121 and 121' may each have a rectangular structure. Voltages of two plates, which are formed by portions of the two third transmission line 121 and 121', of the two capacitors may be controlled by providing voltages to the two third transmission lines 121 and 121', respectively.

Figure 8:
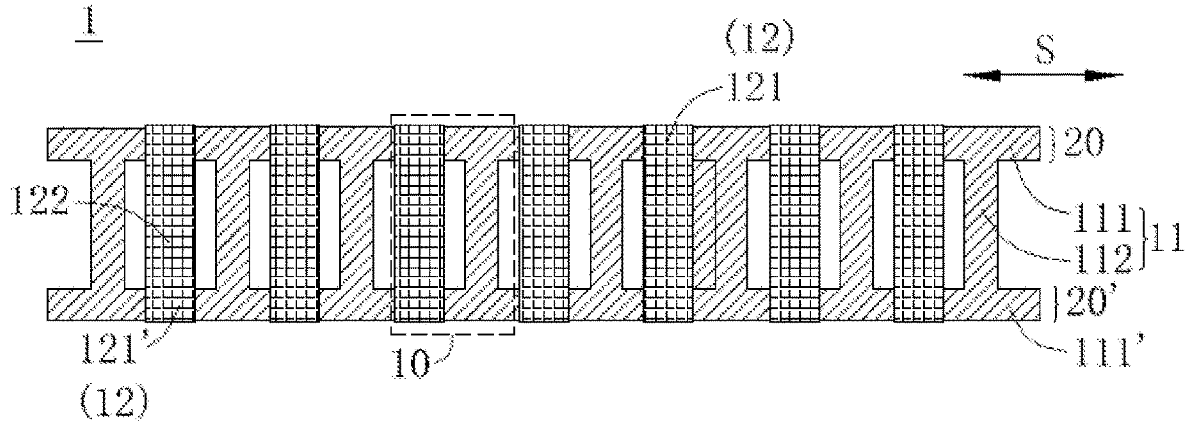
FIG. 8 is a structural diagram of yet another phase shifter, in accordance with some embodiments.

In some embodiments, referring to FIG. 8, the second conductive structure 12 further includes a fourth transmission line 122 connected to the two third transmission lines 121 and 121'.

The dimension of the third transmission line 121 in the direction perpendicular to the extending direction of the phase shift communication path 20 may be less than a dimension of the fourth transmission line 122 in the direction perpendicular to the extending direction of the phase shift communication path 20. The fourth transmission line 122 may have a straight line structure, a curve structure, or a broken line structure, which is not limited herein.

The fourth transmission line 122 is connected to the two third transmission lines 121 and 121'. By only applying a voltage to any one of the two third transmission lines 121 and 121' and the fourth transmission line 122, it is possible to control voltages of the two third transmission lines 121 and 121' simultaneously, thereby changing the voltages of the two plates, which are formed by portions of the two third transmission line 121 and 121', of the two capacitors 13 simultaneously.

In some embodiments, a dimension of the third transmission line 121 in the extending direction of the phase shift communication path 20 may be greater than, or equal to a dimension of the fourth transmission line 122 in the extending direction of the phase shift communication path 20.

For example, in a case where the dimension of the third transmission line 121 in the extending direction of the phase shift communication path 20 is equal to the dimension of the fourth transmission line 122 in the extending direction of the phase shift communication path 20, the second conductive structure 12 constituted by the two third transmission lines 121 and the fourth transmission line 122 has a rectangular structure.

For example, in a case where the dimension of the third transmission line 121 in the extending direction of the phase shift communication path 20 is greater than the dimension of the fourth transmission line 122 in the extending direction of the phase shift communication path 20, the second conductive structure 12 constituted by the two third transmission lines 121 and the fourth transmission line 122 may have a shape of a capital "H" turned on its side.

For example, as shown in FIG. 16, in a case where the fourth transmission line 122 has the broken line structure, the second conductive structure 12 constituted by the two third transmission lines 121 and the fourth transmission line 122 may have a shape of a capital "V" turned on its side.

Of course, the second conductive structure 12 constituted by the two third transmission lines 121 and the fourth transmission line 122 may also have other structures. For example, in a case where the fourth transmission line 122 has a curve structure, the second conductive structure 12 constituted by the two third transmission lines 121 and the fourth transmission line 122 may have a shape of a capital "U" turned on its side. The above description is merely examples of the shape of the second conductive structure 12, which is not limited.

Materials of the third transmission line 121 and the fourth transmission line 122 may be the same or different. For example, the third transmission line 121 is made of a copper material, and the fourth transmission line 122 is made of a silver material or an aluminum material. For another example, the third transmission line 121 and the fourth transmission line 122 are made of a silver material.

Figure 9:
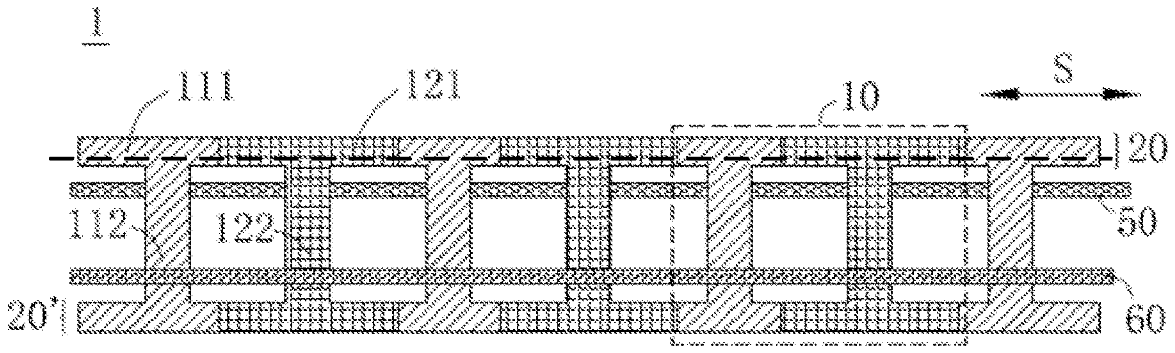
FIG. 9 is a structural diagram of yet another phase shifter, in accordance with some embodiments.
Figure 10:
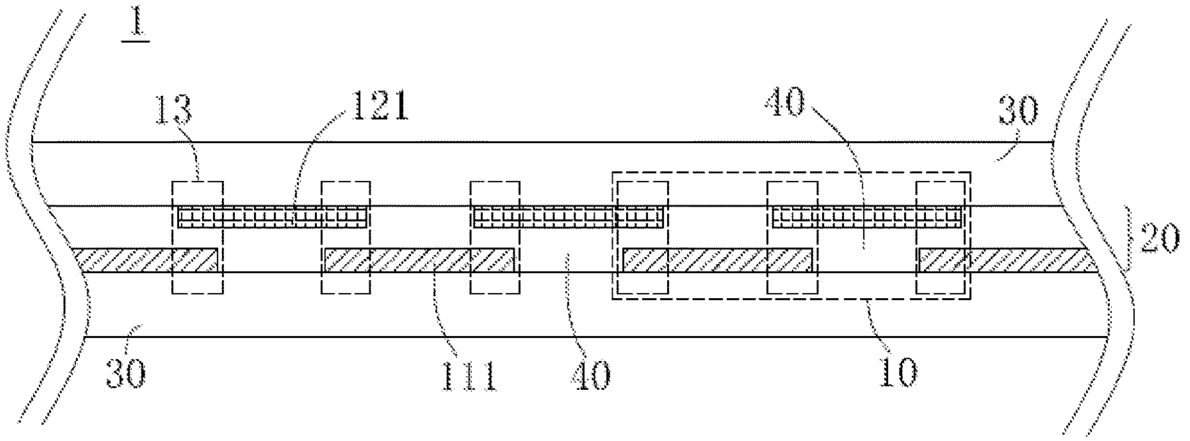
FIG. 10 is a sectional view of yet another phase shifter taken along the dash line in FIG. 9, in accordance with some embodiments.
Figure 11:
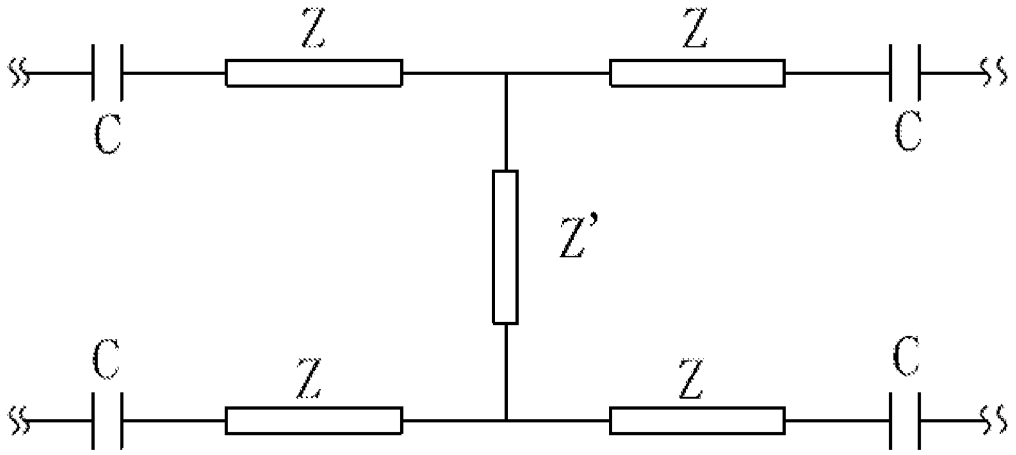
FIG. 11 is an equivalent circuit schematic diagram of another phase shifter, in accordance with some embodiments.

Referring to FIGS. 9 and 10, FIG. 9 is a structural diagram of another phase shifter in accordance with some embodiments, and FIG. 10 is a sectional view of the phase shift communication path 20 in FIG. 9. In some embodiments, as shown in FIG. 9, in the case where the dimension of the third transmission line 121 in the extending direction of the phase shift communication path 20 is greater than the dimension of the fourth transmission line 122 in the extending direction of the phase shift communication path 20, the fourth transmission line 122 may also be configured as an inductive load, and an internal impedance of the fourth transmission line 122 is equivalent to a resistor Z' (FIG. 11). As shown in FIG. 11, an internal impedance of the third transmission line 121 (FIG. 9) is equivalent to a resistor Z, and the capacitor 13 (which also referred to as "C") is formed by the first transmission line 111 and the third transmission line 121. In this way, the phase shift communication path 20 is configured as an RC series circuit, as shown in FIG. 11. Furthermore, since the fourth transmission line 122 has an inductive characteristic, the number of the structures that have the left-hand transmission characteristic in the phase shift unit 10 (FIG. 10) is increased. In this way, a phase advance amount adjusted by a single phase shift unit 10 may be increased.

Figure 12:
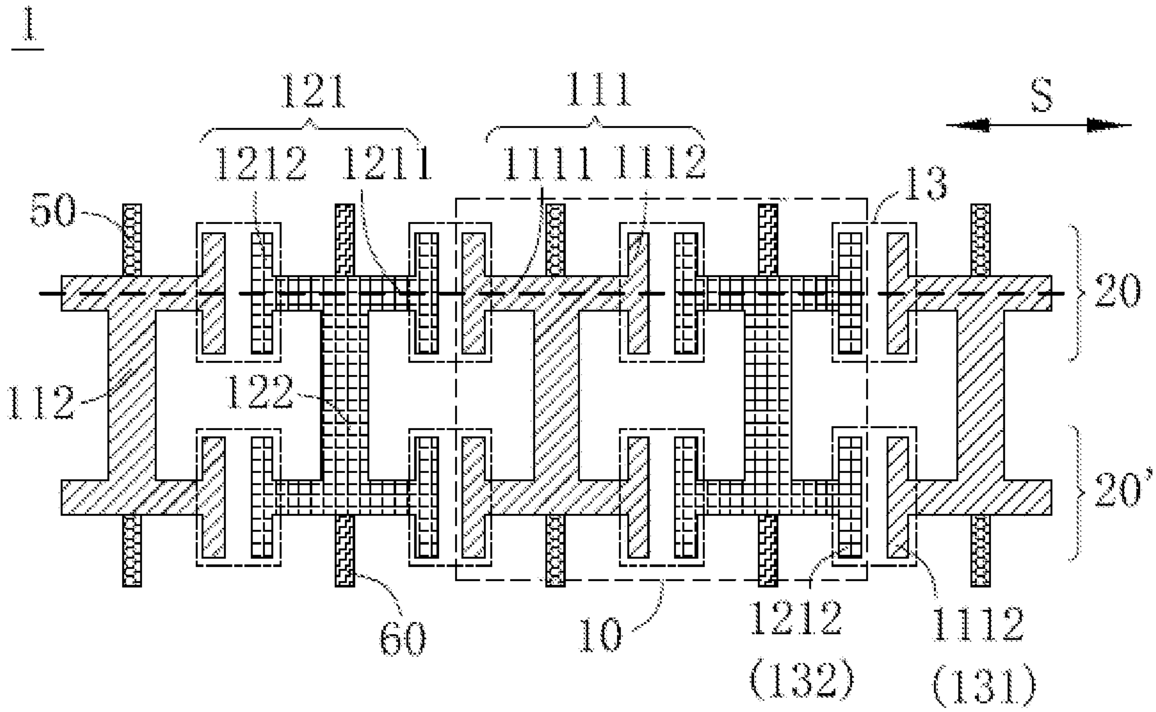
FIG. 12 is a structural diagram of yet another phase shifter, in accordance with some embodiments.
Figure 13:
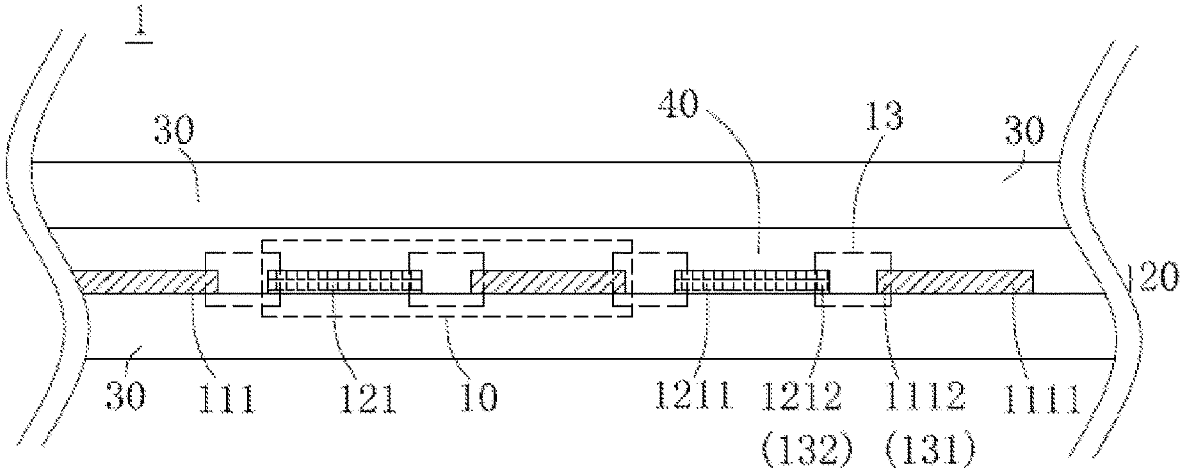
FIG. 13 is a sectional view of yet another phase shifter taken along the dash line in FIG. 12, in accordance with some embodiments.

Referring to FIGS. 12 and 13, FIG. 12 is a structural diagram of yet another phase shifter in accordance with some embodiments, and FIG. 13 is a sectional view of the phase shift communication path 20 in FIG. 12. In some embodiments, as shown in FIGS. 12 and 13, a first end portion 1112 of the first transmission line 111 and a second end portion 1212 of the third transmission line 121 are oppositely arranged at an interval. A potential difference is generated between the first end portion 1112 and the second end portion 1212, thereby forming the capacitor 13.

Figure 14:
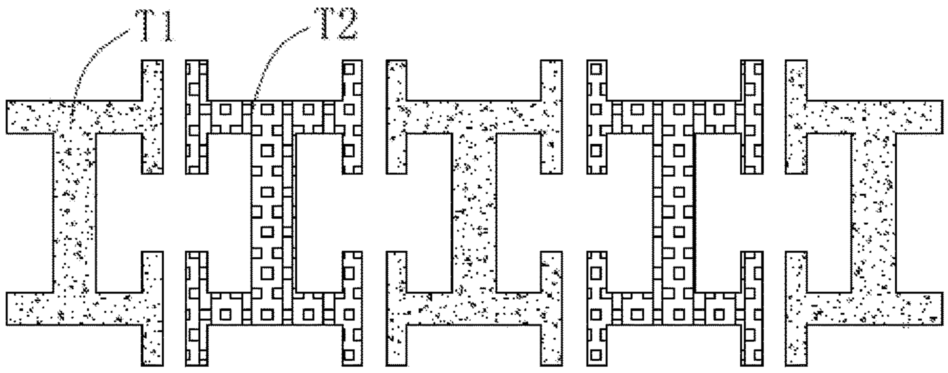
FIG. 14 is a diagram showing a positional relationship between two orthographic projections, in accordance with some embodiments.
Figure 15:
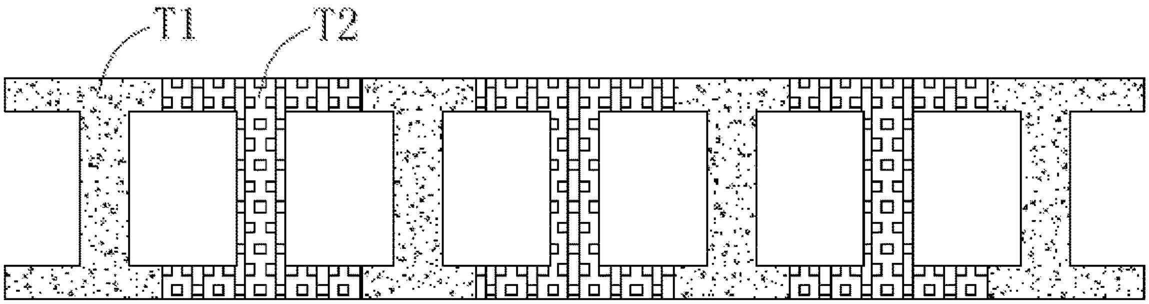
FIG. 15 is a diagram showing another positional relationship between two orthographic projections, in accordance with some embodiments.

In some embodiments, referring to FIG. 8, a plurality of phase shift units 10 includes a plurality of first conductive structures 11 and a plurality of second conductive structures 12. Referring to FIGS. 15 and 14, orthographic projections T1 of the first conductive structures 11 on a plane where the phase shifter 1 is located and orthographic projections T2 of the second conductive structures 12 on the plane where the phase shifter 1 is located are alternately arranged.

In a case where the first conductive structures 11 and the second conductive structures 12 are located in a same plane (as shown in FIG. 14), the plane where the phase shifter 1 is located is the plane where the first conductive structures 11 and the second conductive structures 12 are located. In a case where the plurality of first conductive structures 11 are located in a same plane, and the plurality of second conductive structures 12 are located in another plane (as shown in FIG. 15), the plane where the phase shifter 1 is located may be the plane where the plurality of first conductive structures 11 are located, or the plane where the plurality of second conductive structures 12 are located.

The above description of "orthographic projections being arranged alternately" includes a case where the orthographic projections are arranged alternately at intervals and a case where the orthographic projections are arranged alternately in an overlapping manner. For example, in the case where the first conductive structures 11 and the second conductive structures 12 are located in the same plane, the orthographic projections T1 of the first conductive structures 11 on the plane where the phase shifter 1 is located and the orthographic projections T2 of the second conductive structures 12 on the plane where the phase shifter 1 is located are arranged alternately at intervals, as shown in FIG. 14. In the case where the first conductive structures 11 and the second conductive structures 12 are in different planes, the orthographic projections T1 of the first conductive structures 11 on the plane where the phase shifter 1 is located and the orthographic projections T2 of the second conductive structures 12 on the plane where the phase shifter 1 is located are alternately arranged in the overlapping manner, as shown in FIG. 15.

In some examples, as shown in FIGS. 3, 7, 10 and 13, a third transmission line 121 is configured to form capacitors 13 with two first transmission lines 111 adjacent thereto. For example, an orthographic projection of the third transmission line 121 on the plane where the phase shifter 1 is located and two orthographic projections of the two adjacent first transmission lines 111 on the plane where the phase shifter 1 is located have overlapping regions. The third transmission line 121 and one first transmission line 111 form a capacitor 13 within one overlapping region.

In some other examples, as shown in FIGS. 3, 7, 10 and 13, a first transmission line 111 is configured to form capacitors 13 with two third transmission lines 121 adjacent thereto. For example, an orthographic projection of the first transmission line 111 on the plane where the phase shifter 1 is located and two orthographic projections of the two adjacent third transmission line 121 on the plane where the phase shifter 1 is located have overlapping regions. The first transmission line 111 and one third transmission line 121 form a capacitor 13 within one overlapping region.

In some embodiments, referring to FIGS. 3, 7, 10 and 13, the phase shifter 1 further includes two support layers 30 disposed opposite to each other. The two support layers 30 may be made of a flexible material such as glass, or polyethylene glycol terephthalate (PET). The support layer 30 may have a single layer structure, or a multi-layer structure. For example, the support layer 30 is a single glass layer; for another example, the support layer 30 includes a glass layer, and a PET layer on a surface of the glass layer.

The two support layers 30 may be disposed parallel to each other, and spaced a distance apart from each other. Areas of the two support layers 30 may be the same, or different. The two support layers 30 may form a cuboid structure, that is, the two support layers 30 are directly opposite to each other. Alternatively, the two support layers 30 may form a rhombohedron structure, that is, the two support layers 30 are arranged in a staggered manner, which is not limited herein.

In some embodiments, as shown in FIGS. 3, 7 and 10, the first conductive structure 11 and the second conductive structure 12 are disposed between the two support layers 30. The first conductive structure 11 and the second conductive structure 12 may be disposed on the two support layers 30, respectively. An orthographic projection of the first transmission line 111 on one support layer 30 partially overlaps with an orthographic projection of the third transmission line 121 on the support layer 30. That is, a portion of the first transmission line 111 located in the overlapping region serves as a first plate 131 of the capacitor 13, and a portion of the third transmission line 121 in the overlapping region serves as a second plate 132 of the capacitor 13. The capacitance of the capacitor 13 may be adjusted by varying an area of the region where the orthographic projections of the first transmission line 111 and the third transmission line 121 on the support layer 30 partially overlap.

The plurality of capacitors 13 are connected in series in the phase shift communication path 20. Since the phase shift communication path 20 keeps the capacitive characteristic without a large capacitance, and the more the number of the capacitors connected in series, the smaller the total capacitance value, the capacitance amount of a single capacitor 13 may be large. That is, the area of the region where the orthographic projection of the first transmission line 111 on the support layer 30 and support layer 30 partially overlaps with the orthographic projection of the third transmission line 121 on the support layer 30 may be large. In this way, a requirement for alignment precision between the first transmission line 111 and the third transmission line 121 may be low. As a result, a tolerance to a process deviation in forming the capacitor 13 may be high, and a manufacturing yield of the phase shifter 1 may be improved.

In some embodiments, as shown in FIGS. 12 and 13, the first conductive structure 11 and the second conductive structure 12 are both disposed on one of the two support layers 30. The first transmission line 111 includes a first body portion 1111 and first end portions 1112 connected thereto. The third transmission line 121 includes a second body portion 1211 and second end portions 1212 connected thereto. The first end portion 1112 and the second end portion 1212 are oppositely arranged at an interval to form the capacitor 13.

The first conductive structure 11 and the second conductive structure 12 are arranged at intervals on the same support layer 30. For example, the first conductive structure 11 and the second conductive structure 12 may be formed on the support layer 30 through a single patterning process during manufacturing. Compared with a situation that the first conductive structure 11 and the second conductive structure 12 are respectively formed through respective masks, the number of photomasks may be reduced, and manufacturing cost may be reduced.

The first transmission line 111 includes the first body portion 1111, and the first end portions 1112 connected to both ends of the first body portion 1111. A dimension of the first body portion 1111 in the extending direction of the phase shift communication path 20 may be greater than a dimension of the first end portion 1112 in the extending direction of the phase shift communication path 20. The third transmission line 121 includes the second body portion 1211, and the second end portions 1212 connected to both ends of the second body portion 1211. A dimension of the second body portion 1211 in the extending direction of the phase shift communication path 20 may be greater than a dimension of the second end portion 1212 in the extending direction of the phase shift communication path 20.

The first end portion 1112 and the second end portion 1212 form the capacitor 13. That is, as shown in FIGS. 12 and 13, the first end portion 1112 serves as the first plate 131 of the capacitor 13, and the second end portion 1212 serves as the second plate 132 of the capacitor 13. Sizes of the first end portion 1112 and the second end portion 1212 may be the same or different. The capacitance of the capacitor 13 may be positively correlated with an area of the first end portion 1112 directly facing the second end portion 1212.

In some embodiments, as shown in FIG. 12, a dimension of the first end portion 1112 in the direction perpendicular to the extending direction of the phase shift communication path 20 is greater than a dimension of the first body portion 111 in the direction perpendicular to the extending direction of the phase shift communication path 20. A dimension of the second end portion 1212 in the direction perpendicular to the extending direction of the phase shift communication path 20 is greater than a dimension of the second body portion 1211 in the direction perpendicular to the extending direction of the phase shift communication path 20.

The third transmission line 121 is located on a straight line where the plurality of first transmission lines 111 are located. The first end portion 1112 of the first transmission line 111 and the second end portion 1212 of the third transmission line 121 are oppositely disposed at the interval to form the capacitor 13.

The dimension of the first end portion 1112 in the direction perpendicular to the extending direction of the phase shift communication path 20 and the dimension of the second end portion 1212 in the direction perpendicular to the extending direction of the phase shift communication path 20 may be increased. As a result, the capacitance amount of the capacitor 13 formed by the first end portion 1112 and the second end portion 1212 may be increased. Moreover, process difficulty of aligning the first end portion 1112 with the second end portion 1212 to form the capacitor 13 may be reduced, and the manufacturing yield of the phase shifter 1 may be improved.

In some embodiments, as shown in FIGS. 3, 7, 10 and 13, the phase shifter 1 further includes a dielectric constant adjustable medium 40. The dielectric constant adjustable medium 40 is filled between the two support layers 30.

The dielectric constant adjustable medium 40 may be made of a liquid crystal (LC) material, such as a dispersed liquid crystal material, a polymer dispersed liquid crystal (PDLC) material, or a polymer-stabilized liquid crystal (PSLC) material, which is not limited to the above materials. It will be noted that the various liquid crystal materials are merely described by taking examples. It will be understood that any medium that is able to achieve adjusting dielectric constant may be applied to the dielectric constant adjustable medium of embodiments of the present disclosure.

The dielectric constant adjustable medium 40 is filled between the two support layers 30, and filled between the first conductive structure 11 and the second conductive structure 12. The dielectric constant adjustable medium 40 and the support layers 30 surround the first conductive structure 11 or the second conductive structure 12.

The dielectric constant adjustable medium 40 is configured such that a dielectric constant of the dielectric constant adjustable medium 40 is changed under control of the first plate 131 and the second plate 132 of the capacitor 13. That is, liquid crystal molecules are deflected by changing a potential difference between the first plate 131 and the second plate 132, thereby changing the dielectric constant and changing the phase shift amount of the phase shift unit 10.

In some embodiments, as shown in FIGS. 9 and 12, the phase shifter 1 further includes first control line(s) 50 and second control line(s) 60 as shown in FIG. 9. The first control line(s) 50 are coupled to the first conductive structure(s) 11, and the second control line(s) 60 are coupled to the second conductive structure(s) 12. The dielectric constant adjustable medium 40 is configured to change the dielectric constant of the dielectric constant adjustable medium 40 under control of the first control line(s) 50 and the second control line(s) 60.

The first control line 50 is used to provide a voltage for the first conductive structure 11. A portion of the first conductive structure 11 that is connected to the first control line 50 may be the first transmission line 111 or the second transmission line 112. The second control line 60 is used to provide another voltage for the second conductive structure 12. A portion of the second conductive structure 12 that is connected to the second control line 60 may be the third transmission line 121. In a case where the second conductive structure 12 includes the fourth transmission line 122, the second control line 60 may also be connected to the fourth transmission line, as shown in FIG. 12.

The first control line 50 and the second control line 60 each may be made of a metal or non-metal conductive material. The metal material may be copper, aluminum, silver, or the like. The material of the first control line 50 and the material of the second control line 60 may be the same or different, which is not limited herein.

In a case where the number of the first conductive structures 11 is equal to the number of the second conductive structures 12, the number of the first control lines 50 may be equal to the number of the second control lines 60. In a case where the number of the first conductive structures 11 is different from the number of the second conductive structures 12, the number of the first control lines 50 may be different from the number of the second control lines 60.

The first control line 50 may be located between the first conductive structure 11 and a support layer 30 where the first conductive structure 11 is located. The second control line 60 may be located between the second conductive structure 12 and a support layer 30 where the second conductive structure 12 is located.

In some embodiments, as shown in FIGS. 9 and 10, the first conductive structures 11 and the second conductive structures 12 are disposed on the two support layers 30, respectively. The first control line 50 is located on a side of the first conductive structures 11 away from the second conductive structures 12, and is disposed parallel to the extending direction of the phase shift communication path 20. The second control line 60 is located on a side of the second conductive structures 12 away from the first conductive structures 11, and is disposed parallel to the extending direction of the phase shift communication path 20.

The first conductive structures 11 and the second conductive structures 12 are disposed on the two support layers 30, respectively. That is, the plane where the plurality of first conductive structures 11 are located is different from the plane where the plurality of the second conductive structures 12 are located. The first control line 50 is located on the side of the first conductive structures 11 away from the second conductive structures 12, and the second control line 60 is located on the side of the second conductive structures 12 away from the first conductive structures 11. That is, the first control line 50 and the second control line 60 are disposed away from each other to avoid mutual interference.

The first control line 50 is disposed parallel to the extending direction of the phase shift communication path 20, and is able to be connected to the plurality of first conductive structures 11, so as to control voltages of the plurality of first conductive structures 11 simultaneously. Similarly, the second control line 60 is disposed parallel to the extending direction of the phase shift communication path 20, and is able to be connected to the plurality of second conductive structures 12, so as to control voltages of the plurality of second conductive structures 12 simultaneously.

In some embodiments, the first control line 50 is located on a side of a support layer 30 away from the first conductive structures 11, and the first control line 50 may be connected to the first conductive structures 11 through via holes extending through the support layer 30. The second control line 60 is located on a side of another support layer 30 away from the second conductive structures 12, and the second control line 60 may be connected to the second conductive structures 12 through via holes extending through the another support layer 30.

In some embodiments, as shown in FIGS. 12 and 13, the first conductive structures 11 and the second conductive structures 12 are disposed on a same support layer 30. The first control lines 50 are each disposed perpendicular to the extending direction of the phase shift communication path 20; and the second control lines 60 are each disposed perpendicular to the extending direction of the phase shift communication path 20.

The plurality of first conductive structures 11 and the plurality of second conductive structures 12 are located on a same surface. The first control lines 50 and the second control lines 60 may be disposed on both sides of the first conductive structure 11, respectively. Alternatively, the first control lines 50 and the second control lines 60 may be disposed on a same side of the first conductive structure 11.

The first control line 50 is disposed perpendicular to the extending direction of the phase shift communication path 20. That is, the first control line 50 may be disposed parallel to the second transmission line 112, and may be coupled to the second transmission line 112. Of course, alternatively, the first control line 50 may be coupled to the first transmission line 111, which is not limited herein.

A dimension of the first control line 50 in the extending direction of the phase shift communication path 20 may be less than the dimension of the second transmission line 112 in the extending direction of the phase shift communication path 20. The number of the first control lines 50 may be equal to the number of the second transmission lines 112. In addition, the phase shifter 1 may further includes a wiring connected to the first control lines 50, and voltages of the first control lines 50 may be simultaneously controlled through the wiring.

The second control line 60 is disposed perpendicular to the extending direction of the phase shift communication path 20. That is, the second control line 60 may be disposed parallel to the fourth transmission line 122, and may be coupled to the fourth transmission line 122. Of course, alternatively, the second control line 60 may be coupled to the third transmission line 121, which is not limited herein.

A dimension of the second control line 60 in the extending direction of the phase shift communication path 20 may be less than the dimension of the fourth transmission line 122 in the extending direction of the phase shift communication path 20. The number of the second control lines 60 may be equal to the number of the fourth transmission lines 122. In addition, the phase shifter 1 may further include a wiring connected to the second control lines 60, and voltages of the second control lines 60 may be simultaneously controlled through the wiring.

The wiring connected to the first control lines 50 and the wiring connected to the second control lines 60 may be disposed on both ends of the plurality of first conductive structures 11 and the plurality of second conductive structures 12, respectively, thereby avoiding mutual interference between the two wirings.

In some embodiments, as shown in FIG. 16, at least one of the first transmission line 111, the second transmission line 112 and the third transmission line 121 has a shape of a curve or a broken line.

On a basis of maintaining the impedance of the phase shift communication path 20, the at least one of the first transmission line 111, the second transmission line 112 and the third transmission line 121 is formed in the shape of the curve or the broken line, as shown in FIG. 16. The curve includes a parabola, a sine curve, and the like, which is not limited herein. The shape of the curve or the broken line may shorten a physical length of a transmission line, and it is conducive to miniaturization of the phase shifter 1, thereby improving adaptability of the phase shifter 1 to a variety of scenarios.

In some examples, the first transmission line 111, the second transmission line 112 and the third transmission line 121 may each have the shape of the curve or the broken line.

In some other examples, the first transmission line 111, the second transmission line 112 and the third transmission line 121 may have shapes of different curves. For example, the first transmission line 111 has the shape of the sine curve, the second transmission line 112 has the shape of the parabola, and the third transmission line 121 has a shape of a capital "U".

In yet some other examples, the first transmission line 111 and the third transmission line 121 may each have the shape of the broken line, and the second transmission line 112 may have a straight line structure.

At least one of the first transmission line 111 and the third transmission line 121 have the shape of the curve or the broken line, which may shorten a dimension of the phase shift unit 10 in the extending direction of the phase shift communication path 20. The second transmission line 112 has the shape of the curve or the broken line, which may shorten a dimension of the phase shift unit 10 in the direction perpendicular to the extending direction of the phase shift communication path 20.

In some embodiments, as shown in FIG. 16, at least one of the first transmission line 111, the second transmission line 112 and the third transmission line 121 includes a microstrip line 70 and/or a strip line 80.

The microstrip line 70 has advantages such as high conductivity, good stability, strong adhesion to the support layer 30, and may be formed through a thin film process. The strip line 80 is a transmission line composed of two layers of dielectric medium and a conductor between the two layers of dielectric medium, and has advantages such as small volume, light weight, wide frequency band, simple process, and low cost.

In some examples, the first transmission line 111 may include a microstrip line 70, or may include a strip line 80, or may include a combination of the microstrip line 70 and the strip line 80.

In some examples, the second transmission line 112 may include a microstrip line 70, or may include a strip line 80, or may include a combination of the microstrip line 70 and the strip line 80.

In some examples, the third transmission line 121 may include a microstrip line 70, or may include a strip line 80, or may include a combination of the microstrip line 70 and the strip line 80.

In some examples, the first transmission line 111, the second transmission line 112 and the third transmission line 121 may each include a microstrip line 70 or a strip line 80.

The above examples may be combined with each other. For example, the first transmission line 111 includes a microstrip line 70, the second transmission line 112 includes a combination of a microstrip line 70 and a strip line 80, and the third transmission line 121 includes a strip line 80. For another example, the first transmission line 111 and the third transmission line 121 each include a microstrip line 70, and the second transmission line 112 includes a strip line 80. Other combinations are also possible, which is not limited herein.

Figure 17:
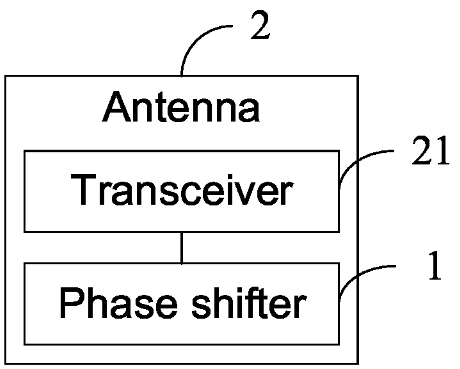
FIG. 17 is a structural diagram of an antenna, in accordance with some embodiments.

As shown in FIG. 17, some embodiments of the present disclosure provide an antenna 2. The antenna 2 includes a transceiver 21 and the phase shifter 1 as described above. The transceiver 21 is electrically connected to the phase shifter 1 for transmitting and receiving signals. The antenna 2 includes the above phase shifter 1. Therefore, the antenna 2 has the advantages of the phase shifter 1 that the delay line required in the phase balance may be shortened or even omitted, it is conducive to the amplitude phase design of the phase control electronically scanned array, and the overall loss of the phase shifter 1 may be reduced.

Figure 18:
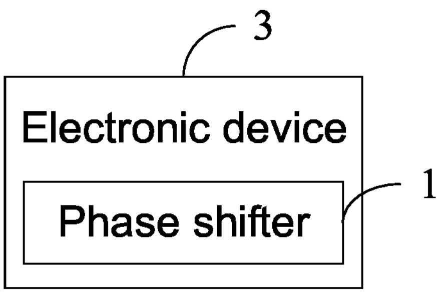
FIG. 18 is a structural diagram of an electronic device, in accordance with some embodiments.

As shown in FIG. 18, some embodiments of the present disclosure provide an electronic device 3. The electronic device 3 includes the phase shifter 1 as described above. The electronic device 3 includes the phase shifter 1 described above. Therefore, the electronic device 3 has the advantages of the phase shifter 1 that the delay line required in phase balance may be shortened or even omitted, it is conducive to the amplitude phase design of the phase control electronically scanned array, and the overall loss of the phase shifter 1 may be reduced.

The above description is only specific embodiments of the present disclosure, but the scope of protection of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A phase shifter, comprising:

a plurality of phase shift units coupled in sequence, wherein at least one phase shift unit of the plurality of phase shift units includes:

a first conductive structure including at least one first transmission line, and a second transmission line connected to the at least one first transmission line, the second transmission line being configured as an inductive load, wherein the at least one first transmission line of the first conductive structure includes two first transmission lines, the second transmission line is connected to the two first transmission lines; and the two first transmission lines are configured to transmit two signals that are differential mode signals of each other; and a second conductive structure including at least one third transmission line, each third transmission line of the at least one third transmission line being configured to form a capacitor with a first transmission line of the two first transmission lines, wherein the first transmission line of the two first transmission lines, a corresponding third transmission line of the at least one third transmission line and the capacitor constitute at least a portion of a phase shift communication path of the phase shifter.

2. The phase shifter according to claim 1, wherein at least one of the first transmission line of the two first transmission lines, the second transmission line and the corresponding third transmission line of the at least one third transmission line has a shape of a curve or a broken line; or at least one of the first transmission line of the two first transmission lines, the second transmission line and the corresponding third transmission line of the at least one third transmission line includes a microstrip line and/or a strip line.

3. The phase shifter according to claim 1, wherein a dimension of at least one of the two first transmission lines in an extending direction of the phase shift communication path is greater than a dimension of the second transmission line in the extending direction of the phase shift communication path; and the second transmission line is located between the two first transmission lines, and the second transmission line is connected to any portion of each first transmission line of the two first transmission lines other than both ends thereof.

4. The phase shifter according to claim 1, wherein the at least one third transmission line of the second conductive structure includes two third transmission lines, one third transmission line of the two third transmission lines is configured to form the capacitor with one of the two first transmission lines, and another third transmission line is configured to form the capacitor with another of the two first transmission lines.

5. The phase shifter according to claim 4, wherein the second conductive structure further includes a fourth transmission line connected to the two third transmission lines.

6. The phase shifter according to claim 5, wherein a dimension of at least one of the two third transmission lines in an extending direction of the phase shift communication path is greater than or equal to a dimension of the fourth transmission line in the extending direction of the phase shift communication path.

7. The phase shifter according to claim 4, wherein the two third transmission lines are arranged at an interval there between.

8. The phase shifter according to claim 1, wherein the plurality of phase shift units each include the first conductive structure and the second conductive structure, orthographic projections of first conductive structures of the plurality of phase shift units on a plane where the phase shifter is located and orthographic projections of second conductive structures of the plurality of phase shift units on the plane where the phase shifter is located are alternately arranged, wherein a corresponding third transmission line of a corresponding one of the second conductive structures is configured to form corresponding capacitors with two first transmission lines adjacent thereto of a corresponding one of the first conductive structures respectively; and/or a corresponding first transmission line of a corresponding one of the first conductive structures is configured to form corresponding capacitors with two third transmission lines adjacent thereto of a corresponding one of the second conductive structures respectively.

9. The phase shifter according to claim 1, further comprising two support layers disposed opposite to each other, wherein the first conductive structure and the second conductive structure are disposed on two sides, proximate to each other, of the two support layers, respectively; and an orthographic projection of the first transmission line of the two first transmission lines on one of the two support layers partially overlap with an orthographic projection of the corresponding third transmission line of the at least one third transmission line on one of the two support layers to form the capacitor.

10. The phase shifter according to claim 9, further comprising:

a dielectric constant adjustable medium filled between the two support layers.

11. The phase shifter according to claim 10, further comprising: a first control line and a second control line, wherein the first control line is coupled to the first conductive structure, and the second control line is coupled to the second conductive structure; and the dielectric constant adjustable medium is configured such that a dielectric constant of the dielectric constant adjustable medium is changed under control of voltages of the first control line and the second control line.

12. The phase shifter according to claim 11, wherein the first control line is disposed on a side of the first conductive structure away from the second conductive structure, and is disposed parallel to an extending direction of the phase shift communication path; and the second control line is disposed on a side of the second conductive structure away from the first conductive structure, and is disposed parallel to the extending direction of the phase shift communication path.

13. The phase shifter according to claim 1, further comprising two support layers disposed opposite to each other, wherein the first conductive structure and the second conductive structure are both disposed on a side of one of the two support layers facing another of the two support layers; and the first transmission line of the two first transmission lines includes a first body portion and first end portions connected thereto, the corresponding third transmission line of the at least one third transmission line includes a second body portion and second end portions connected thereto, and a first one of the first end portions and a second one of the second end portions are oppositely arranged at an interval to form the capacitor.

14. The phase shifter according to claim 13, further comprising:

a dielectric constant adjustable medium filled between the two support layers.

15. The phase shifter according to claim 14, further comprising: a first control line and a second control line, wherein the first control line is coupled to the first conductive structure, and the second control line is coupled to the second conductive structure; and the dielectric constant adjustable medium is configured such that a dielectric constant of the dielectric constant adjustable medium is changed under control of voltages of the first control line and the second control line.

16. The phase shifter according to claim 15, wherein the first control line is disposed perpendicular to an extending direction of the phase shift communication path; and the second control line is disposed perpendicular to the extending direction of the phase shift communication path.

17. The phase shifter according to claim 13, wherein a dimension of the first end portion of first end portions in a direction perpendicular to an extending direction of the phase shift communication path is greater than a dimension of the first body portion in the direction perpendicular to the extending direction of the phase shift communication path; and a dimension of the second end portion of the second end portions in the direction perpendicular to the extending direction of the phase shift communication path is greater than a dimension of the second body portion in the direction perpendicular to the extending direction of the phase shift communication path.

18. An antenna, comprising:

the phase shifter according to claim 1; and a transceiver electrically connected to the phase shifter.

19. An electronic device, comprising:

the phase shifter according to claim 1.

* * * * *